United States Patent [19]
Clore

[11] Patent Number: 6,002,235
[45] Date of Patent: Dec. 14, 1999

[54] BATTERY JUMP STARTER WITH JAW SECURING MEANS

[75] Inventor: Kevin L. Clore, Kansas City, Mo.

[73] Assignee: Bonnet Enterprises LLC, Kansas City, Mo.

[21] Appl. No.: 09/251,577

[22] Filed: Feb. 17, 1999

[51] Int. Cl.[6] .............................. H01M 2/02; H01R 3/00; H02J 7/00
[52] U.S. Cl. .......................... 320/105; 429/170; 439/500
[58] Field of Search ............................. 320/105; 429/170; 439/500

[56] References Cited

U.S. PATENT DOCUMENTS

| | | | |
|---|---|---|---|
| 4,489,223 | 12/1984 | Puckett et al. | 191/12.2 |
| 5,111,130 | 5/1992 | Bates | 320/105 |
| 5,166,478 | 11/1992 | Sprouse | 174/138 |
| 5,183,407 | 2/1993 | Srol | 439/135 |
| 5,589,292 | 12/1996 | Rozon | 429/170 |
| 5,793,185 | 8/1998 | Prelec et al. | 320/104 |

Primary Examiner—Gregory J. Toatley, Jr.
Attorney, Agent, or Firm—Shook, Hardy & Bacon L.L.P.

[57] ABSTRACT

A portable battery jump start unit of the type having a portable housing containing a battery to which cables carrying battery clamps are permanently connected. The clamps are stored on rectangular posts on the sides of the housing, with flat areas on the jaw ends of the clamps held against the flat sides of the posts to prevent rotation. An end plate on each post prevents the clamps from slipping off. A storage compartment for a battery charger has slots in its bottom panel to receive electrical prongs of the charger body to hold the charger body in place when stored.

20 Claims, 2 Drawing Sheets

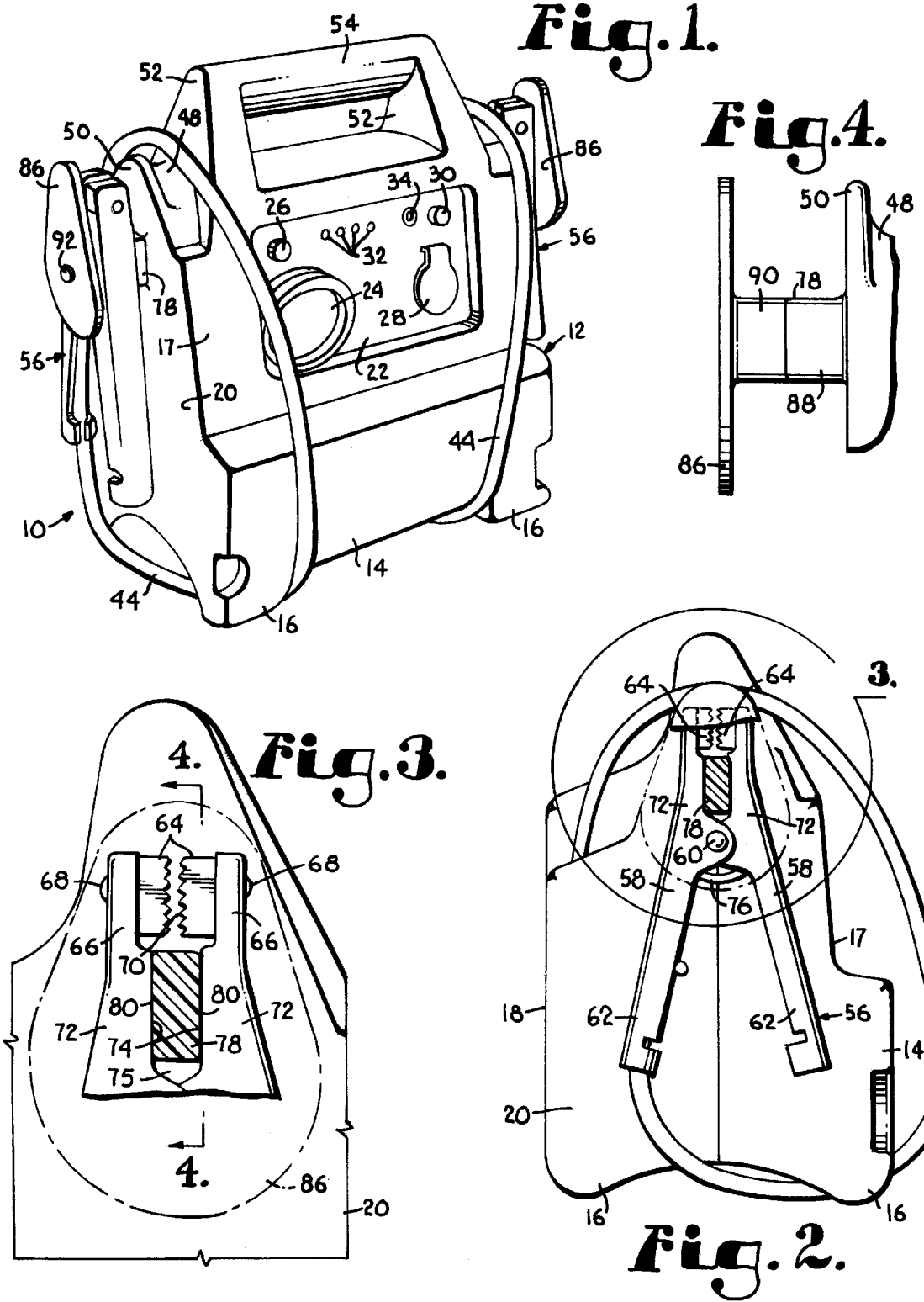

BATTERY JUMP STARTER WITH JAW SECURING MEANS

FIELD OF THE INVENTION

This invention relates generally to the jump starting of automotive type batteries and more particularly to a self-contained jump start unit having battery clamps that are securely retained in place in a storage position when not in use. Additionally, the invention relates to a jump start unit that provides for improved storage of a battery charger when it is not being used.

BACKGROUND OF THE INVENTION

Battery jumper cables are commonly used to jump start automobiles and other vehicles having batteries that are discharged. A booster battery, typically one on another vehicle, is positioned in the vicinity of the discharged battery to allow use of the jumper cables to bypass the discharged battery and start the disabled vehicle. Once the vehicle has been started, its battery is charged to its normal voltage level by a generator or alternator carried on the vehicle.

Among the disadvantages of jump starting vehicles in this manner is the need for another vehicle having a properly charged battery. If the disabled vehicle is in an isolated location or if another vehicle is not readily available for some other reason, this procedure can involve considerable delay. Even then, it is necessary for space to be available close enough to the discharged battery for the second vehicle to be positioned where the cables can be extended between the two batteries. It is not unusual for the cables to be attached improperly to the battery terminals, and such improper connections can cause damage to the battery or electrical system of one or both vehicles.

In recognition of these and other problems, self-contained jump start units have been developed. On these devices, a booster battery is contained inside of a housing and is equipped with cables and battery clamps that are connected to the battery terminals, either permanently, removably, or through a switch. A vehicle with a discharged battery can be started by connecting the clamps of the jump start unit to the battery terminals of the disabled vehicle and using the booster battery to bypass the discharged battery.

In recent years, portable jump start units that can be carried by hand from place to place have been available in addition to larger wheel mounted units. The portable device is only slightly larger than a modern automotive battery and can be conveniently carried on a vehicle so that it is available in the event of a problem with the normal vehicle battery. It is also easy to position the jump start unit close to the discharged battery in situations where limited space is available. An example of a portable jump start unit is disclosed in U.S. Pat. No. 5,589,292.

A problem with the portable jump start units that have been proposed in the past is the way in which the battery clamps are stored when they are not being used. The clamps are often connected permanently to the battery terminals, and they are always "live" (although units with switches have been available). Therefore, the clamps should be stored so that they are protected from being inadvertently contacted by other objects or by the other clamp of the jump start unit. Units such as that described in U.S. Pat. No. 5,589,292 not only fail to secure the clamps in a secure and stable position when they are not being used, but they actually allow the clamps to turn about a round pin against which the jaws of the clamp are closed.

Another problem has been that the clamp handles or other parts of the clamps can project (due to rotation or otherwise) beyond the plane of the front or back of the housing. Consequently, if the unit is lying on a conductive surface, the only thing preventing a short circuit is insulation on the clamps, which can be worn away or otherwise lose its insulative effect.

Battery chargers are usually provided with the jump starter so that the booster battery can be maintained in a fully charged condition. The battery charger normally has a body containing a transformer that can be plugged into an electrical outlet. A plug carried on a cord extending from the charger body can be inserted into a jack on the jump starter housing in order to make charging current available to the battery contained in the housing.

If the battery charger is to be available when needed, it must be stored with the jump start unit. Portable units that have been available in the past and have provided for storage of the battery charger have stored the charger either in a simple cavity, where it can fall out, or loosely in a storage compartment, where it can rattle around unduly and fall out when the compartment is opened.

SUMMARY OF THE INVENTION

The present invention is directed to a portable battery jump start unit which is constructed to securely retain the battery clamps in a fixed storage position when they are not being used and which has an improved storage compartment for holding a battery charger.

In accordance with the invention, a jump start unit has a housing provided on its opposite sides with sidewardly projecting posts. The posts are generally rectangular in section so that they mate with similarly shaped openings on the jaw ends of the clamps. Each clamp opening has straight opposite edges that fit closely against the flat sides of the posts, with the spring which urges the jaws to close acting to retain the clamps in place against the posts.

This construction prevents the clamps from turning on the post or otherwise moving from the intended storage position. An enlarged end plate is located on the outer end of each post to shield the clamp jaws and prevent them from slipping off of the posts.

Another feature of the invention is that the housing is shaped to prevent any part of the clamps from projecting beyond the front or back planes of the housing. Consequently, the unit is not subject to a short circuit when placed on a conductive surface such as the floor of an automobile trunk.

The invention is further characterized by a uniquely arranged storage compartment on the back of the housing for storing of a battery charger. The storage compartment has a removable cover which can be applied to enclose the charger when it is being stored. It is a particular feature of the invention that the bottom of the storage compartment has a pair of slots (or a rectangular opening) for receiving the electrical prongs of the charger body in order to prevent the charger body from sliding out of position. At the same time, space for storage of the battery charger cord is provided between the charger body and the front wall of the storage compartment.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a front perspective view of a portable jump start unit constructed according to a preferred embodiment of the

Figure 5:
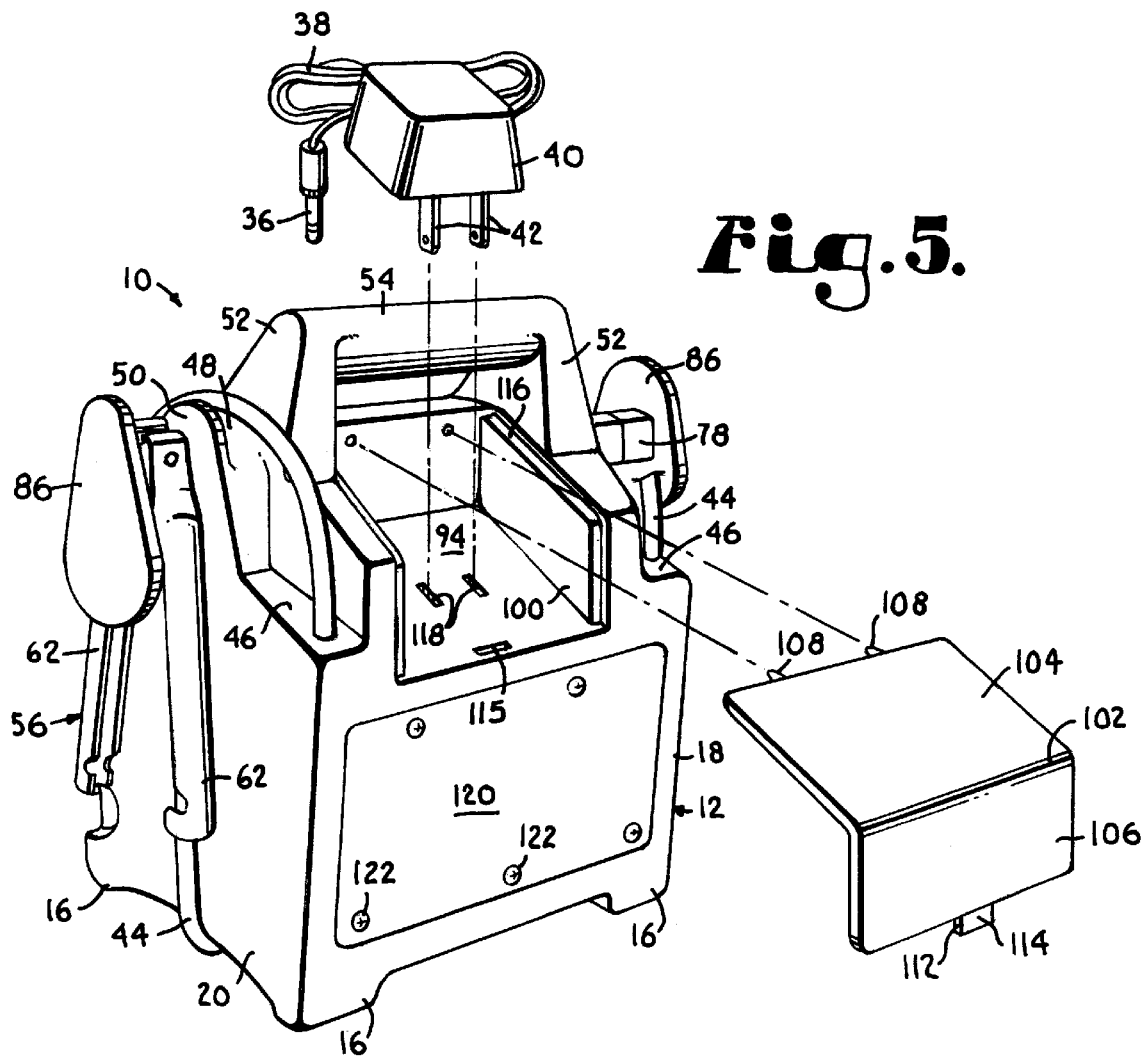
Figure 6:
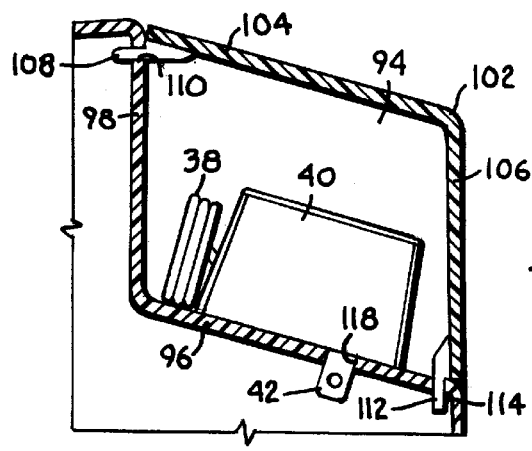

3 present invention, with the battery clamps of the jump start unit secured in their storage positions;

FIG. 2 is a side elevational view of the jump start unit taken from the left side;

FIG. 3 is a fragmentary elevational view on an enlarged scale showing the portion identified by detail 3 in FIG. 2;

FIG. 4 is a fragmentary view taken generally along line 4—4 of FIG. 3 in the direction of the arrows;

FIG. 5 is a rear perspective view of the jump start unit shown in FIG. 1, with selected components exploded for purposes of illustration; and FIG. 6 is a fragmentary sectional view taken through the battery charger storage compartment of the jump start unit and showing the battery charger stored therein.

DETAILED DESCRIPTION OF THE INVENTION

Referring now to the drawings in more detail and initially to FIG. 1 in particular, numeral 10 generally designates a portable battery jump start unit constructed in accordance with a preferred embodiment of the present invention. The jump start unit 10 includes a hollow shell or housing which is generally identified by numeral 12 and which may be constructed of molded plastic or another suitable material. The housing 12 includes a relatively broad base 14 equipped with feet 16 that allow the unit to rest in a stable position on a suitable supporting surface.

The housing 12 includes a front face 17, a back 18 (FIG. 5), and a pair of opposite sides 20. The housing 12 carries within it a sealed automotive type battery (not shown). Above the base 14, the front face 17 of the housing is provided with a panel 22. The panel 22 includes a light 24 which is powered by the battery and which is controlled by an on/off button 26 mounted on panel 22. The panel 22 is also provided with a DC outlet which is normally plugged by a removable cover 28 and which provides an outlet for DC power from the unit. A status button 30 is also provided on panel 22 and may be depressed to check the status of the battery which is then indicated on a plurality of indicator lights 32 on panel 22. Finally, panel 22 has a charging jack 34 for receiving a plug 36 (see FIG. 5) carried on the end of a cord 38 of a battery charger. The battery charger includes a charger body 40 from which the cord 38 extends. The charger body 40 contains a conventional transformer (not shown) and is provided with a pair of electrical prongs 42 which allow the body 40 to be connected with a conventional AC power outlet.

The jump start unit 10 includes a pair of flexible cables 44, one of which is a positive cable connected with the positive battery terminal at a location within the housing 12. The other cable 44 is a negative cable which connects with the negative battery terminal at a location within the housing 12. As best shown in FIG. 5, the cables extend to the exterior of the housing 12 through ledges 46 located adjacent to the back 18 of the housing. Near its upper end, the housing 12 presents a pair of saddles or shoulders 48 located near the opposite sides 20 of the housing. Each shoulder 48 is provided with an adjacent flange 50 so that when one of the cables 44 is strung along the shoulder 48, the flange 50 helps to retain the cable on the shoulder 48. Upwardly extending lugs 52 are formed on housing 12 adjacent to the shoulders 48, and a handle 54 extends between the lugs 52 to provide a hand grip for carrying and handling of the unit 10.

Each cable 44 is equipped on its free end with a battery clamp 56 which may have a conventional construction. As best shown in FIG. 2, each clamp 56 includes a pair of arms 58 which are pivotally connected at intermediate locations thereon by a pivot coupling 60 which extends through inwardly projecting lugs on the arms 58. One end of each arm 58 provides a hand grip 62. The opposite end of each arm 58 carries a jaw 64. With particular reference to FIG. 3, the jaws 64 are mounted on end tabs 66 by suitable fasteners 68. The jaws 64 of each clamp 56 oppose one another and are provided with a plurality of teeth 70 for gripping against a battery terminal. The jaws 64 are constructed of an electrically conductive metal.

With continued reference to FIG. 3 in particular, each arm 58 has a shank portion 72 which extends from the end tab 66 to the area of the lug that receives the pivot coupling 60. The shank portions 72 of each clamp have opposing edges 74 which are spaced apart from one another. The edges 74 are straight along most of their lengths and provide surfaces having flat areas that face one another. An open space 75 is presented between the opposing edges 74 of the shank portions 72.

Each clamp 56 is provided with a spring 76 (FIG. 2) which continuously urges the hand grips 62 apart. The jaws 64 are thus continuously urged toward one another to a closed position in which the jaws come together. Each cable 44 extends generally inside of one of the hand grips 62 of each clamp 56 and has its conductive wires suitably connected with at least one of the jaws 64 of the clamp.

When not in use, the clamps 56 are stored on a pair of posts 78. The posts 78 project outwardly from the opposite sides 20 of the housing near the top of the unit at locations slightly below the flanges 50. The posts 78 are preferably aligned with one another on the opposite sides of the unit. As best shown in FIG. 3, each post 78 has a rectangular configuration in section and includes flat opposite side surfaces 80 and top and bottom surfaces which extend between the side surfaces 80. The sides 80 of each post are located to be flatly engaged by the flat areas 74 of the arms 58 when the jaws 64 are nearly but not completely closed against one another, as shown in FIG. 3. Thus, when the clamps 56 are applied to the posts 78, each post is closely received within and extends through the space 75 which is presented between the shanks 72.

The outer end of each post 78 is provided with an enlarged plate 86 which may be a curved shape having a relatively large lower portion and a smaller upper portion to generally conform with the shape of the top part of each clamp 56 when the jaws are nearly closed. As best shown in FIG. 3, the plate 86 is large enough to cover the upper portion of the clamp 56 when it is applied to the post 78. Thus, the jaws 64 are shielded on the outside by the plate 86.

With reference to FIG. 4 in particular, each post 78 may be constructed with a stub portion 88 which may be molded as part of the side 20. An outer portion 90 of each post may be formed as part of the plate 86 and may be suitably connected with the outer end of the stub 88, as by means of a screw or other fastener (not shown). For the sake of appearance, the passage in which the fastener is applied may be closed by a plug 92 (FIG. 1). Each post 78 is long enough to accommodate the thickness of the upper portions of the arms 58 between the housing side 20 and the end plate 86.

It is a particular feature of the invention that the clamping posts 78 are arranged to cooperate with the clamps 56 in a manner to prevent the clamps, when stored on the posts, from projecting beyond the front face 17 or the back face 18 of the housing. As best shown in FIG. 2, when the clamps are applied to the posts, all parts of the clamps 56 are maintained between the plane of the back 18 and the front face 17, with no part of either arm 58, or either grip 62 or either jaw 64 projecting beyond the front face 17 or the back face 18. Consequently, if the unit is placed on its front face or back face on a conductive surface such as a metal automobile trunk floor, the clamps 56 do not contact the conductive surface to possibly create a short circuit. This prevents potential problems that plague units and is due to the anti-rotation provided by the fit between the posts and clamps as well as the configuration of the housing to avoid projection of the clamps beyond the plane of the front or back housing surface.

Referring now to FIGS. 5 and 6 in particular, the back of the housing 12 is provided with a storage compartment 94 which provides for storage of the battery charger, including the body 40, the cord 38 and the plug 36. The storage compartment 94 is located above the battery which is contained in the housing 12 and generally between the ledges 46. When the storage compartment 94 is open, it is accessible from the back of the unit.

The storage compartment has a floor or bottom panel 96 which inclines downwardly from front to back (see FIG. 6). A generally vertical front wall 98 of the storage compartment connects with the front edge of the bottom panel 96. The opposite sides of the storage compartment are formed by opposite side walls 100. The bottom panel 96, wall 98 and sides 100 may all be molded as an integral part of the housing 12.

A removable (or hinged) cover panel 102 for the storage compartment 94 may be removed to open the top and back of the storage compartment and provide access to its contents. The cover 102 has a generally L-shaped configuration and include a top panel 104 and a back panel 106 which is joined with the rear edge of the top panel 104. Both of the panels 104 and 106 are generally rectangular. The front edge of panel 104 is provided with a pair of forwardly projecting pins 108 that fit closely in a pair of openings 110 when the cover panel 102 is applied to the storage compartment. The openings 110 are formed through the front panel 98 of the storage compartment 94. The bottom edge portion of panel 106 is provided with a downwardly projecting tab 112 which is provided with a locking lip 114 and which may be fitted through a slot 115 formed near the back edge of the inclined bottom panel 96 of the storage compartment. The locking lip 114 fits beneath panel 96 to lock the cover 102 in place when the tab 112 is inserted through slot 115 to apply the cover and enclose the storage compartment 94. The cover 106 may be removed by flexing the back panel 106 forwardly far enough to allow the locking lip 114 to be removed upwardly through the slot 115. The cover 102 may then be pulled rearwardly to remove pins 108 from openings 110 in order to remove the cover 102. Each of the sides 100 of the storage compartment may be provided with recesses 116 extending along its top and back edge in order to receive the side edges of the cover 102 for a close fit of the cover on the storage compartment 94.

The inclined bottom panel 96 of the storage compartment is provided with a pair of parallel slots 118 which are spaced apart and sized to receive the electrical prongs 42 of the battery charger body 40. When the prongs 42 are fitted through the slots 118 as shown in FIG. 6, the charger body 40 rests on the bottom panel 96 with sufficient space provided in front of the charger body to accommodate storage of the cord 38 and the plug 36 between the charger body and the front wall 98 of the storage compartment 94. Because of the extension of the prongs 42 through the slots 118, the charger body 40 is held in place in the storage compartment and does not rattle around unduly or slide out of the storage compartment when it is opened by removal of the cover 102. At the same time, the cover 102 can be easily removed to provide access to the battery charger when it is needed for charging of the battery contained within the housing 12 of the unit. As an alternative to the slots 118, a single rectangular opening may be provided in the panel 96 to closely receive the prongs 42 and thus serve the same function as the slots.

Access to the battery and the other internal components of the housing 12 is provided through an opening in the back of the housing which is normally covered by a removable cover panel 120. The cover panel 120 may be secured to the back 18 of the housing by a plurality of screws 122 or other fasteners which may be removed to allow removal of the panel 120. When the panel 120 is removed, a relatively large opening in the back 18 of the housing is exposed so that the battery and other internal components are accessible through the opening.

When the jump start unit 10 is not in use, the battery clamps 56 may be stored in the manner shown in FIG. 1. The cables 44 may be drawn upwardly along and over the shoulders 48 and then downwardly beneath the front feet 16. The cables are long enough that the clamps 56 can be applied to the storage posts 78 with the cables drawn relatively tight.

With particular reference to FIG. 3, the clamp surfaces 74 lie flatly along the opposite sides 80 of each post 78 such that there is a relatively long area of flat contact between each clamp and each post. The action of the spring 76 tending to close the jaws 64 retains the surfaces 74 securely against the post sides 80. It is noted that the jaws 64 are not completely closed so that the spring action is applied through the clamp to the post. This arrangement provides a stable, fixed storage position for each clamp and prevents any rotation of the clamp about the axis of the post or any other movement of the clamp when it is in the stored position. The end plates 86 act against the clamps to assure that they cannot slip off the ends of the posts.

When the clamps 56 are in their storage position, the hand grips 62 extend downwardly along the housing sides 20 well below the end plates 86. Accordingly, the hand grips 56 are readily accessible and can be pressed toward one another to release the shanks 72 from the posts 78, thus freeing the clamps and allowing them to be pulled downwardly far enough to clear the plates 86. The cables 44 can then be extended as necessary to reach the terminals of the discharged battery.

As previously indicated, the presence of the slots 118 (or a rectangular opening) in the battery charger storage compartment 94 provide for a stable position of the charger body 40 when it is not in use. When the battery charger is needed, the cover 102 can be easily removed, and the battery charger can be removed so that its plug 36 can be inserted into the jack 34 and the prongs 42 can be applied to an electrical outlet in order to charge the battery contained within the housing 18.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A portable battery jump start unit comprising:

a substantially enclosed housing containing a battery;

a cable connected with said battery and extending outside of said housing;

a clamp on said cable which includes a pair of pivotally connected arms each having one end portion providing a hand grip and an opposite end portion providing a clamping jaw, at least one of said jaws being electrically conductive and connected with the cable;

means for urging said arms to pivot in a direction to move said jaws together;

a surface adjacent said opposite end portion of each arm having a generally flat area, said surfaces on the respective arms being spaced apart and opposing one another; and a clamping post on said housing for storing said clamp, said post having opposite sides for receiving and mating with said flat areas of the arms in a manner to substantially prevent rotation of the clamp on the post when applied thereto.

2. A jump start unit as set forth in claim 1, wherein said post has a substantially rectangular configuration in section.

3. A jump start unit as set forth in claim 2, wherein said surfaces on the respective arms comprise substantially straight edges on the arms providing said flat areas.

4. A jump start unit as set forth in claim 1, wherein said surfaces on the respective arms comprise substantially straight edges on the arms providing said flat areas.

5. A jump start unit as set forth in claim 1, including an end plate on said post for retaining said clamp thereon.

6. A jump start unit as set forth in claim 1, including:

a charging jack on said housing for accepting power to charge the battery;

a battery charger including a charger body having a pair of electrical prongs and a cord having a plug for insertion into said jack;

a storage compartment on the back of said housing for storing of said charger when not in use, said compartment having a bottom surface presenting an opening for receiving said prongs to maintain said charger body in place on the floor when stored in said compartment; and a removable cover for said compartment, said compartment being substantially enclosed when said cover is applied thereto.

7. A jump start unit as set forth in claim 6, wherein said opening comprises a pair of slots for closely receiving the respective prongs.

8. A jump start unit as set forth in claim 1, wherein:

said housing has front and back surfaces; and said clamping post is arranged to retain said clamp applied thereto at a location to prevent any part of the clamp from extending beyond said front or back surface.

9. A portable battery jump start unit comprising:

a substantially enclosed housing containing a battery and having opposite sides;

a pair of cables extending from the battery outside of the housing;

a pair of clamps on the respective cables each including a pair of pivotally connected arms, each of said arms having one end portion providing a hand grip and an opposite end portion carrying a clamping jaw and including a substantially flat area;

means for urging said arms to pivot in a direction to move said jaws together, said flat areas of the jaws in each pair being spaced apart and opposing one another when the jaws are substantially closed on one another; and a pair of clamping posts extending from the respective sides of the housing for storing said clamps, each post having opposite sides for receiving and mating with said flat areas of the corresponding clamp in a manner to resist turning of the clamp on the post.

10. A jump start unit as set forth in claim 9, wherein each post has a substantially rectangular configuration in section.

11. A jump start unit as set forth in claim 10, wherein said flat areas of the jaws are arranged to engage the opposite sides of the posts along substantially the entire vertical extent of said sides.

12. A jump start unit as set forth in claim 11, wherein said jaws are spaced away from one another when said flat areas are applied to the opposite sides of said posts.

13. A jump start unit as set forth in claim 11, including an end plate on each post for retaining the corresponding clamp thereon.

14. A jump start unit as set forth in claim 9, including an end plate on each post for retaining the corresponding clamp thereon.

15. A jump start unit as set forth in claim 9, wherein said jaws are spaced away from one another when said flat areas are applied to the opposite sides of said posts.

16. A jump start unit as set forth in claim 9, including:

a charging jack on said housing for accepting power to charge the battery;

a battery charger including a charger body having a pair of electrical prongs and a cord having a plug for insertion into said jack;

a storage compartment on the back of said housing for storing of said charger when not in use, said compartment having a bottom surface presenting an opening for receiving said prongs to maintain said charger body in place on the floor when stored in said compartment; and a removable cover for said compartment, said compartment being substantially enclosed when said cover is applied thereto.

17. A jump start unit as set forth in claim 16, wherein said opening comprises a pair of slots for closely receiving the respective prongs therein.

18. A jump start unit as set forth in claim 9, wherein:

said housing includes front and back surfaces; and said posts are arranged to retain the clamps applied thereto with no part of either clamp projecting beyond said front surface or said back surface.

19. A portable battery jump start unit comprising:

a substantially enclosed housing containing a rechargeable battery, said housing having a front and a back and a charging jack for accepting power to charge the battery;

a pair of cables connected with the battery each carrying a battery clamp;

a battery charger including a charger body having a pair of electrical prongs and a cord having a plug for insertion into said jack;

a storage compartment on the back of said housing for storing of said charger when not in use, said compartment having a bottom surface presenting an opening for receiving said prongs to maintain said charger body in place on the floor when stored in said compartment; and a removable cover for said compartment, said compartment being substantially enclosed when said cover is applied thereto.

20. A jump start unit as set forth in claim 19, wherein said opening comprises a pair of slots for closely receiving the respective prongs therein.

\* \* \* \* \*